United States Patent [19]
Pitts, Jr.

[11] 4,162,400
[45] Jul. 24, 1979

[54] FIBER OPTIC WELL LOGGING MEANS AND METHOD

[75] Inventor: Robert W. Pitts, Jr., Houston, Tex.

[73] Assignee: Texaco Inc., New York, N.Y.

[21] Appl. No.: 831,844

[22] Filed: Sep. 9, 1977

[51] Int. Cl.² .............................................. G01V 5/00
[52] U.S. Cl. .................................... 250/256; 250/263
[58] Field of Search ............... 250/253, 256, 262, 263, 250/199, 551, 416 TV, 363 S, 368; 340/18

[56] References Cited

U.S. PATENT DOCUMENTS

| | | | |
|---|---|---|---|
| 2,931,905 | 4/1960 | Caha et al. | 250/368 |
| 3,413,466 | 11/1968 | Allen, Jr. | 250/368 |
| 3,668,396 | 6/1972 | Asars et al. | 250/416 TV |
| 4,047,045 | 9/1977 | Paxton, Jr. et al. | 250/551 |
| 4,056,719 | 11/1977 | Waaben | 250/551 |

*Primary Examiner*—Davis L. Willis
*Attorney, Agent, or Firm*—Thomas H. Whaley; Carl G. Ries; Ronald G. Gillespie

[57] ABSTRACT

A well logging system provides at least one output corresponding to a condition sensed in a borehole traversing an earth formation. The well logging system includes a logging instrument which includes a sensor sensing the condition and providing electrical pulses corresponding in number and peak amplitude to the sensed condition. A converting circuit connected to the sensors converts each electrical pulse into a light pulse whose intensity corresponds to the peak amplitude. A well logging cable connected to the logging instrument includes a light conductor. The logging instrument further includes a circuit for applying the light pulses to one end of the light conductor. Surface apparatus includes a converter connected to the other end of the light conductor for converting each light pulse into a corresponding electrical pulse having a peak amplitude representative of the intensity of the light pulse. Circuitry connected to the electrical converter processes the electrical pulses provided by the light to electrical converter to provide the output corresponding to the sensed condition.

9 Claims, 3 Drawing Figures

FIBER OPTIC WELL LOGGING MEANS AND METHOD

BACKGROUND OF THE INVENTION

Field of the Invention

The present invention relates to measuring systems and methods in general and, more particularly, to well logging systems and methods.

SUMMARY OF THE INVENTION

A well logging system provides at least one output corresponding to a condition sensed in a borehole traversing earth formation. The system comprises a logging instrument including a sensor sensing the condition and providing electrical pulses corresponding in number and peak amplitude to the sensed condition. An electrical to light converter converts each electrical pulse to a light pulse whose intensity is representative of the peak amplitude of the electrical pulse. A well logging cable includes a light conductor. The logging instrument includes a circuit for applying the light pulses to one end of the light conductor. Surface apparatus includes a light to electrical converter which converts each light pulse transmitted over the light conducting cable into an electrical pulse having a peak amplitude representative of the intensity of the light pulse generated by the sensed condition.

DESCRIPTION OF THE INVENTION

Figure 1:
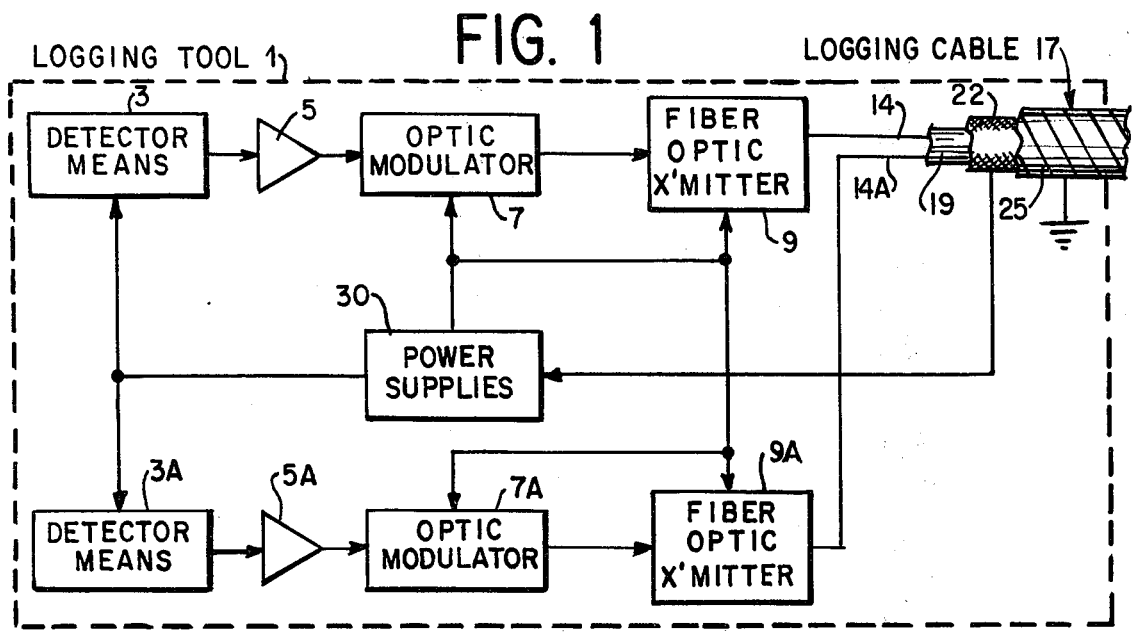
FIG. 1 is a simplified block diagram of a logging tool constructed in accordance with the present invention.

Referring to FIG. 1, a logging tool 1, adapted to be passed through a borehole traversing an earth formation, includes detector means 3, 3A. Elements identified with a number and a letter are identical in construction and operation as elements having the same number without a letter. Detector means 3, 3A are conventional type detectors detecting gamms radiation emitted by the earth formation resulting from the natural isotopes of the earth formation or from neutron bombardment of the earth formation and providing electrical pulses corresponding in number and pulse height to the detected radiation. Pre-amps 5, 5A amplify the pulses from detector means 3 and 3A, respectively, and provide them to optic modulators 7 and 7A, respectively. Optic modulators 7, 7A convert electrical pulses to light pulses on a one for one basis, the intensity of each light pulse being representative of the amplitude of its corresponding electrical pulse.

The light pulses from optic modulators are provided to fiber optic transmitters 9, 9A, respectively, which applies them to optic fibers 14 and 14A, respectively, which are part of a logging cable 17.

Figure 2:
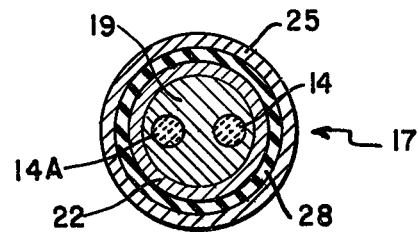
FIG. 2 is a cross sectional representation of the logging cable shown in FIG. 1.

Referring also to FIG. 2, logging cable 17 has optic fibers 14, 14A contained in a protective material 19 such as polypropylene which has a copper sheath 22 surrounding it. An outer conductive armor 25 is separated from sheath 22 by an insulating material 28 such as polypropylene.

Power supplies 30 receives a direct current voltage from sheath 22, as hereinafter explained, and provides energizing voltages to detector means 3 and 3A, pre-amps 5 and 5A, optic modulators 7 and 7A, and fiber optic transmitters 9 and 9A. Although not shown for convenience, detector means 3 and 3A, pre-amps 5 and 5A, optic modulators 7 and 7A, fiber optic tranmsitters 9 and 9A, and power supplies 30 are connected to ground.

Figure 3:
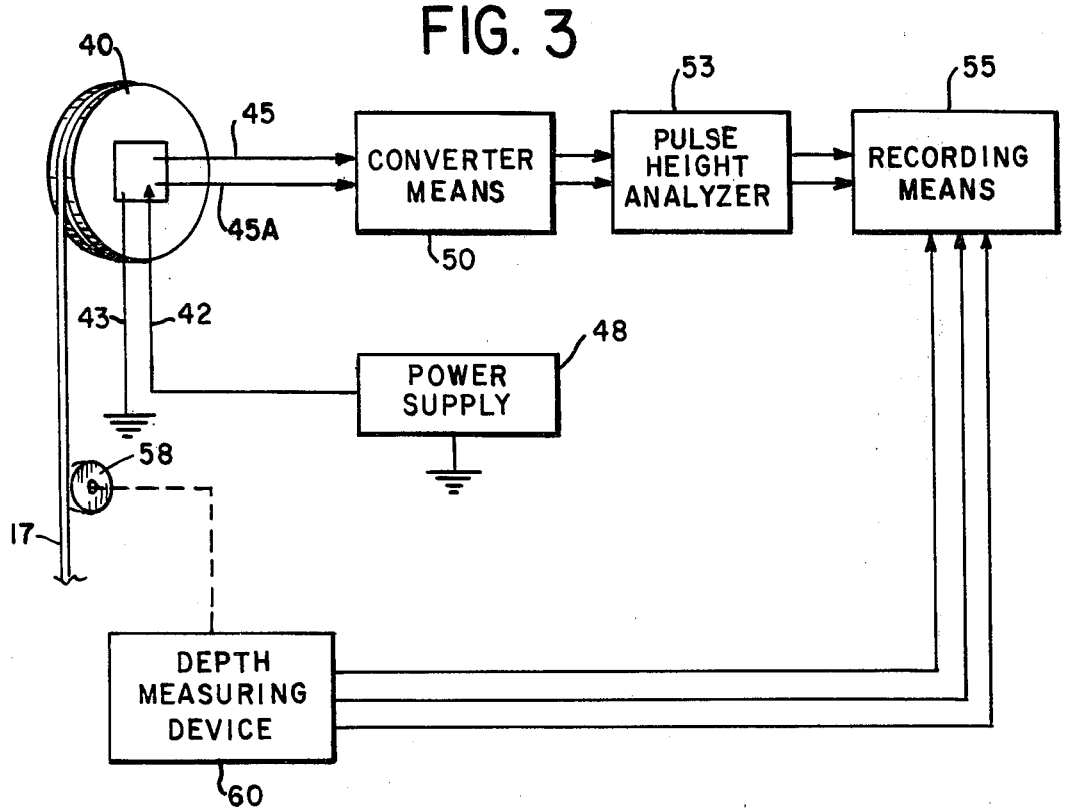
FIG. 3 is a simplified block diagram of the surface apparatus constructed in accordance with the present invention for making a well log.

Referring now to FIG. 3, cable 17 is contained on movable drum 40 having connected there with electrical conductors 42 and 43 connected to sheath 22 and to armor 25 of coble 17 (via slip rings, nor shown) and optical conductors 45 and 45A which are connected directly to optic fibers 14 and 14A, respectively, of cable 17. A direct current voltage power supply 48 provides a direct current voltage to power supplies 30 in logging tool 1 by way of sheath 22 of cable 17. Power supply 48 and conductor 43 are connected to ground so that armor 25 of cable 17 provides a return path for the direct current volate provided to power supplier 30.

The light pulses transmitted by optic conductors 45, 45A are converted by converter means 50 to corresponding electrical pulses corresponding in number and peak amplitude to the detected gamma radiation in the borehole. Converter means 50 may be photomultiplier tubes (one tube per detector means) or other suitable devices. The pulse outputs from converter means 50 are applied to pulse height analyzers 53. The outputs from the pulse height analyzers provide their outputs to conventional recording means 55 for recording.

A measuring wheel 58 controls a depth measuring device 60 which provides electrical signals, related to the depth of logging tool 1 in the borehole. The signals are provided to recording means 55.

The present invention as hereinbefore described provides for the transmission of raw data from radiation detectors in a borehole, up-hole without further processing. The electrical pulses representative of the detected gamma radiation are converted to light pulses which are transmitted. At the surface, the light pulses are converted back into electrical pulses.

What is claimed is:

1. A well logging system for providing at least one output corresponding to a condition sensed in a borehole traversing an earth formation, comprising a logging instrument including means for sensing the condition and providing electrical data pulses corresponding in number and peak amplitude to the sensed condition, and first converting means connected to the sensing means for providing a light pulse for each received electrical pulse and corresponding in intensity to the peak amplitude of the electrical pulses; a well logging cable including a light conductor, and said logging instrument further includes means for applying the light pulses to one end of the light conductor; and surface apparatus including second converting means connected to the other end of the light conductor for converting each light pulse into corresponding electrical pulse having a peak amplitude corresponding to the intensity of the light, and means connected to the second converting means for processing the electrical pulses therefrom to provide the output corresponding to the sensed condition.

2. A well logging system as described in claim 1 in which the sensing means is a radiation detector detecting gamma radiation emanating from the earth formation and providing the data pulses in accordance therewith.

3. A well logging system as described in claim 2 in which the first converting means is an optic modulator.

4. A well logging system as described in claim 3 in which the means for applying the light pulses to the light conductor is a fiber optic transmitter.

5. A well logging system as described in claim 4 in which the logging instrument further includes power suppliers for providing energizing voltages to the radiation detector, to the optic modulator and to the fiber optic transmitter; and the well logging cable further includes a conductive sheath surrounding the light conductor, material separating the light conductor from the sheath and conductive outer armor and a coaxial insulator separating the conductive sheath from the outer armor and the surface apparatus further includes means for providing a direct current voltage across the sheath and the outer armor and the power supply are connected to the sheath and across the outer armor.

6. A well logging system as described in claim 5 in which the second converting means is a photomultiplier tube.

7. A well logging system as described in claim 6 in which the processing means includes a pulse height analyzer receiving electrical pulses from the second converting means and provides a plurality of outputs corresponding to the pulse height analysis, and recording means connected to the pulse height analyzer and receiving signals corresponding to the depth of the logging tool in the borehole for recording the signals from the pulse hight analyzer.

8. A well logging method for providing at least one output corresponding to a condition sensed in a borehole traversing an earth formation, comprising the steps of sensing the condition in the borehole, providing electrical data pulses corresponding in number and peak amplitude to the sensed condition, providing a light pulse for each electrival pulse which corresponds in intensity to the peak amplitude of the electrical pulses; conducting the light pulses to the surface by way of a light conductor, converting each light pulse to a corresponding electrical pulse having a peak amplitude corresponding to the intensity of the light pulse, and processing the converted electrical pulses to provide the output corresponding to the sensed condition.

9. A well logging method as described in claim 8 in which the sensing step includes detecting gamma radiation emanating from the earth formation.

* * * * *